Inventor
HERBERT S. POLIN

HERBERT S. POLIN.

Patented Feb. 26, 1952

2,587,213

UNITED STATES PATENT OFFICE 2,587,213

TELEMETERING DEVICE

Herbert S. Polin, Rio de Janeiro, Brazil, assignor to Audience Computing System, Inc., New York, N. Y., a corporation of New York Application March 24, 1947, Serial No. 736,705

8 Claims. (Cl. 250—2)

The present invention concerns apparatus and methods in the field of telemetering.

It is an object of this invention to provide means to determine data and indicate the summation thereof as a whole or selectively in order to yield desired information.

It is an object of this invention to provide means whereby quantitative information of the total number of outlying receiving points adjusted to a predetermined signal is indicated at a central point.

It is an object of this invention to provide means to determine the total number of radio-broadcast receivers that are active at a given time.

It is an object of this invention to provide means arranged to indicate automatically, at some central point, the total number of radio receiving stations in a selected area that are tuned to a particular frequency or transmitting station at a given moment.

It is an object of the invention to provide means whereby the operator of a radio set may vote or indicate an individual preference.

In the field of radio-broadcasting it is desirable for many reasons to know the number of listeners to the program. It is usually desirable to eliminate programs which have little or no appeal and select those which have a wide range of acceptance. Again the value of any advertising medium depends directly upon the public it reaches. Many newspapers and magazines have advertising rates which are a function of their circulation. Many radio programs are paid according to the number of listeners or relative rating they enjoy. These listeners are now counted by the poll method, which is laborious, costly and in many cases is probably not accurate to a desirable number of significant figures. The sampling taken is assumed representative and every effort is no doubt exerted to make it so, but the methods now employed make a reasonably accurate determination prohibitive in cost. Telephoning, written communication or personal canvass leave much to be desired. Even an elaborate recording device connected to the radio receiver in a selected group of homes which prints a time base record registering the "off" and "on" hours of the individual set as well as the station selected for each "on" period is open to some of the serious objections of the other methods as well as objections peculiar to it. A service man periodically removes the record and the data are tabulated from the records of all the recording machines outstanding. Such apparatus is costly, requires constant servicing for collection of records, the installation of new data rolls or charts as well as repair. Such a system by its very nature must be quite limited and its accuracy can be no better than the representativeness of the sample selected. With such systems a small error is magnified by a multiplier which is the ratio of the total number of receivers to those thus specially equipped.

The present system here disclosed is inexpensive to install, may be incorporated as an integral part of a new radio receiving set, or may be installed as an auxiliary unit of an old set. There is no recorded chart and no servicing operation at the receiving set.

The method by which this indication may be achieved is diagrammatically illustrated in the accompanying drawings which illustrate the diagrammatic layout of the system as a whole. Outlying radio receiving sets are each equipped with a device tuned to a selective modulation or signal on the carrier frequency of any transmitting station. This device, which may be a type of vibrating reed relay, is identified with a load of electrical characteristic, such as resistance, inductance, capacitance, phase shift, etc., and with a conductive path whereby, upon receipt of the predetermined signal by radio, the vibrating reed relay closes a circuit which applies the aforesaid electrical load across the conductive path. The sets are connected with power lines which are connected to substations through suitable meters. Assuming that the load applied to the line by the action of the relay be resistance and that the meter be an ammeter, then, for the time period that the transmitting station emits the signal to which the relays are responsive, the ammeter will register, in addition to its normal load, the additional short duration or transient load synchronous in time and duration with the transmitted signal. The increment of change between the normal load and the additional load responsive to the transmittal signal may be calibrated in "number of receiving sets," and thus, the difference in load may give a direct indication of the number of receiving stations tuned to a particular transmitting station at a particular time.

A city's power service is normally composed of a number of substations, each serving a particular district, and it is the plan of the system herein proposed to transmit the information registered at each substation to a central point. At this point the load at each substation, responsive to the signal frequency, may be totalized. A convenient method for measuring the change responsive to the signal frequency is by the use of a cathode ray oscillograph.

Since load perturbations are normally occurring constantly in any power line, and since only those perturbations responsive to the signal frequency are to be measured, discrimination is obtained by a coding plan related to a time axis. This is accomplished by feeding into the oscillograph the total of the loads registered at each of the substations and by applying, in the oscillograph, an artificial load of equal and opposite characteristic. As the load varies fortuitously from minute to minute, or from hour to hour, the artificial load of opposite sign varies with it. When, however, the radio transmitting station emits the signal frequency in a predetermined coded pattern, the artificial load is maintained constant and the oscillograph registers the increment of change produced by the signal frequency. Simultaneously, the timing circuit of the oscillograph has impressed upon it the pattern of the signal frequency code.

The system described has been illustrated as applied to a power line. It is obvious, of course, that any conductive path would serve to transmit the desired information and a telephone line, or any other convenient conductor would serve.

While one form of increment indication as registered by an oscillograph or the like involves the summation of power represented by a multiplicity of resistance loads, it is equally obvious that capacity or inductance, or both, may serve as the signal-responsive load, with appropriate instruments in each instance, for their measurement. The unique requirement for the system is that the load be of a character capable of being summed, that is, that each additional unit applied to the transmission line shall contribute a proportional change modifying the total of its characteristic upon the line. Thus, the load may consist of a phase-shifting circuit applied to the transmission line or, the load may consist of a combination of inductance, capacity, resistance, phase-shift, etc.

The specific parts comprising the various units may be described as follows:

1. *Transmitter.*—At the radio transmitting station the apparatus consists of a modulator, for example a 10-cycle per second low frequency signal unit. The modulator is equipped with a coding key of predetermined pattern. By telephone line or similar circuit, this modulator is connected with the oscillograph in the central station, or totalizing center. It may also be desirable to locate the coding key at the totalizing center.

2. *Totalizing center.*—The equipment here consists of telemetric lines from each of the substations with the information derived from these lines fed into a cathode ray oscillograph. The cathode ray oscillograph includes a timing circuit and a bucking circuit. The master key of the modulator is introduced into the oscillograph circuit in such form that it registers its pattern upon the timing circuit and simultaneously disconnects the automatic follow-up of the bucking circuit. Thus the artificial load is maintained in synchronous opposition to the normal load until the instant that the modulator signal is initiated. For the short duration of this signal pattern, the artificial load is not affected by the actual load. As the modulator coded pattern terminates, the artificial load again functions in automatic opposition to the normal load.

It is desirable to have a recording system associated with the oscillograph.

3. *Substations.*—The equipment at each substation consists only of a means for transmitting the load changes, as they occur, to the totalizing center. Many systems for transmitting information telemetrically are known in the art, and any of these will serve.

4. *Radio receivers.*—Each radio receiving set must have included in its output a discriminatory device responsive to a particular signal. Since one feature of the totalizing system here described is its capacity to indicate separately the number of receivers tuned simultaneously to broadcasting stations operating on different frequencies, it is advantageous that the signal-responsive device be included in the audio rather than in the radio-frequency elements of the receiving set. The signal unit may comprise a simple vibrating reed relay, with or without amplification (tuned to the 10-cycle per second signal mentioned in 1 above). The relay, responsive to the broadcast signal frequency, closes a circuit which includes the signal load, for example, a one watt resistance.

The cycle of operation of the system as a whole is as follows: Assume that 100,000 receiving sets are so equipped in a given locality. During the broadcast, the totalizing center desires to know how many sets are tuned to a particular broadcasting station. The coding key is depressed and the transmitting station under test transmits the low frequency signal modulation during its program. (The low frequency signal is of short duration and in a frequency range substantially outside of acoustical interference.) As the transmitting radio station broadcasts the signal frequency, the oscillograph at the totalizing center registers the increment of change in the standard load, and finds that the peak, synchronous in time with the signal frequency, shows an increase of 20 kilowatts. This indicates that of the total 100,000 stations equipped for this service, 20,000 were tuned to the station under test.

Another feature of described system is the possibility of utilizing the system as a voting device. By inserting a switch in each receiving set whereby the listener may apply the signal load across the line, each listener, in response to a broadcast questionnaire, may register his preference. This switch also may be of a type that transmits a coded pattern.

In the drawing like numbers refer to like parts throughout.

Figure 1:
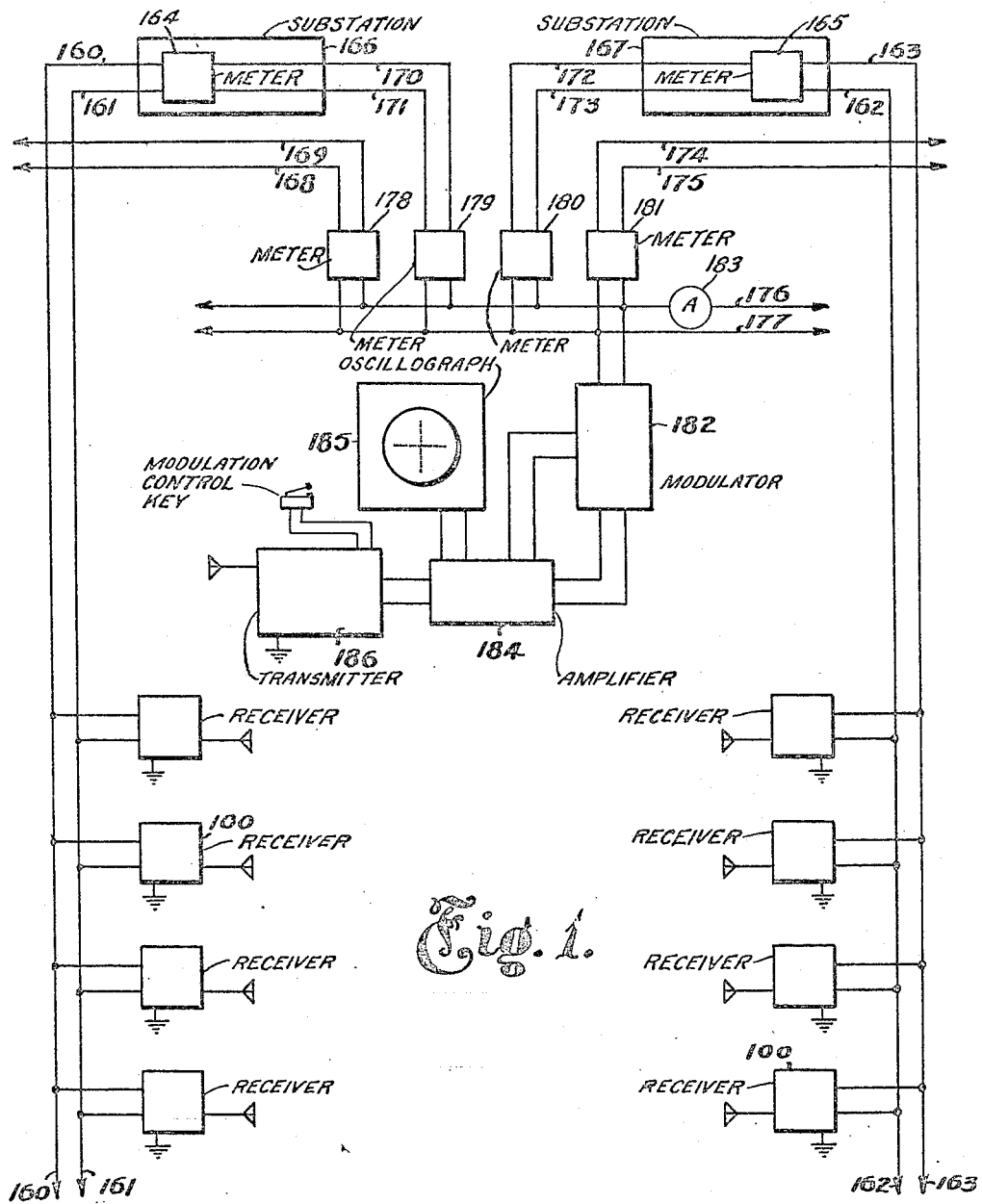
Figure 1 is a schematic diagram of an entire system employing the invention.
Figure 2:
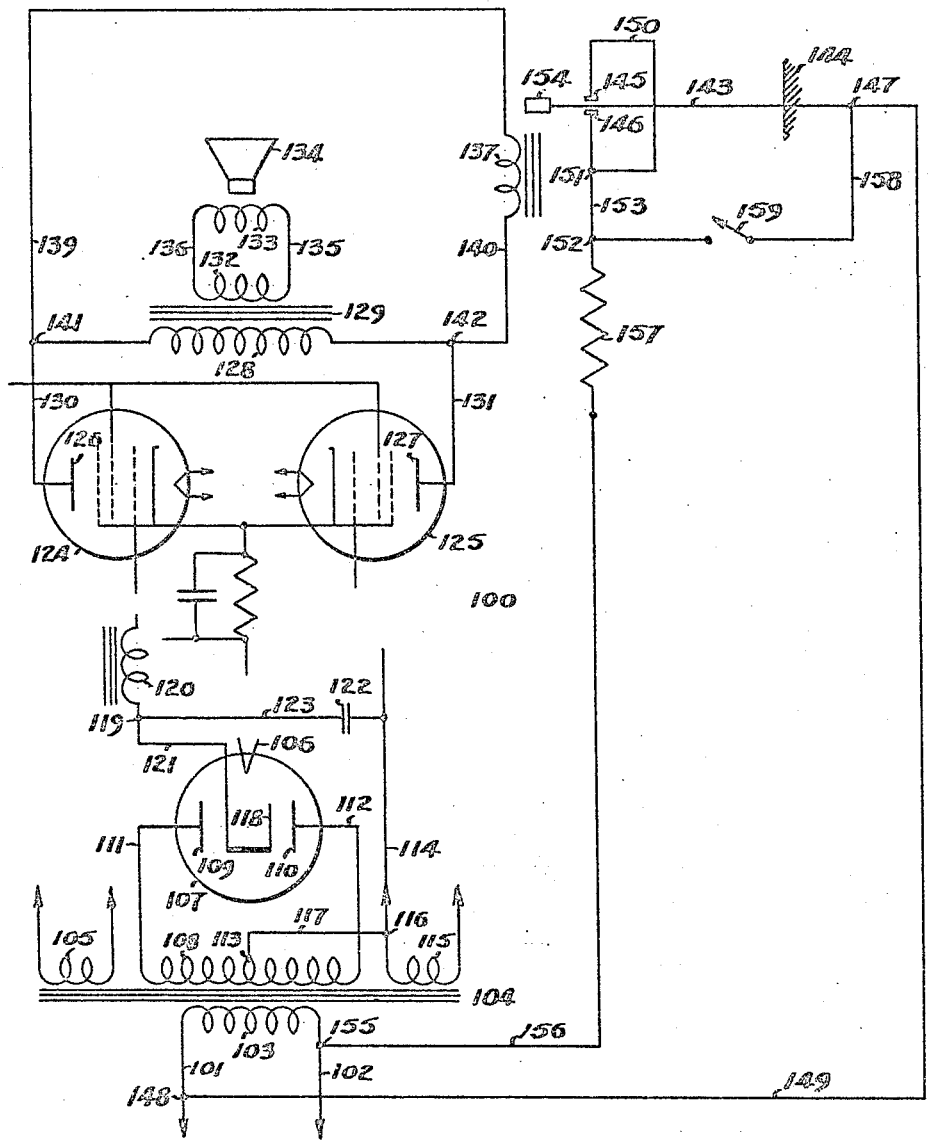
Fig. 2 is a fragmentary circuit diagram of a superheterodyne receiver equipped with one form of the invention.

A standard broadcast receiver 100 is connected to power lines 101 and 102 by the normal plug leading from the primary 103 of power supply transformer 104. Secondary 105 leads to filament 106 of rectifier tube 107 of the type known as VT-74. Secondary 108 has each end connected to plates 109 and 110 of tube 107 by wires 111 and 112 respectively. A central tap 113 is taken off secondary 108 and connected to wire 114 of heater secondary 115 at junction 116 by wire 117. Cathode 118 is connected to junction 119 and power supply filter choke inductance 120 by wire 121. Junction 119 is connected to wire 114 through filter condenser 122 by wire 123.

The power amplifier comprises tubes 124 and 125 of the type known as VT-66 connected in push-pull. Plates 126 and 127 are connected one to each end of primary 128 of output matching transformer 129 by wires 130 and 131. Secondary 132 is connected to voice coil 133 of speaker 134 by wires 135 and 136.

A loaded inductance 137 is connected in parallel with primary 128 by wires 139 and 140 at junctions 141 and 142. A metallic reed 143 is positioned on mounting 144 in such a manner that it lies within the field of inductance coil 137. Reed 143 is weighted at its free end by adjustable weight 154 which controls its frequency. A frequency of ten cycles per second has been selected as serviceable in most cases. The vibration is inaudible save as it may be added to or subtracted from other frequencies in the audible range. It is recognized that the frequency response of a commercial receiver may well be poor at ten cycles per second. Nevertheless, although a ten cycle signal may be considerably attenuated after the original modulated carrier has been detected, some of this signal will appear in the output of the receiver. This factor of attenuation should be taken into account in the design of reed 143, and the moment of inertia of the reed 143 should be such that the attenuated signal will still effect a build up of oscillation of the reed. Reed 143 extends freely between a pair of contacts 145 and 146. There is sufficient space between reed 143 and contacts 145 and 146 to require a three to five cycle oscillatory build-up before the amplitude of vibration of reed 143 is such that it closes the circuit and touches contact 145 or 146. A random pulse will not close the circuit.

Terminal 147 is mounted on the base of reed 143 and is connected at junction 148 to line 101 by wire 149. Contacts 145 and 146 are joined by wire 150 containing junction 151 and connected to junction 152 by wire 153. Junction 152 is connected to junction 155 on line 102 by wire 156 containing resistance 157. Resistance 157 preferably has a rating of about one watt. Junctions 147 and 152 are connected by wire 158 containing manually operated switch or voting key 159.

Home receivers 100, or any similar device concerning which data is desired or by which, alone or in conjunction with other apparatus, data may be determined, are parallel across local lines 160, 161, 162 and 163 as shown. These local lines lead to meters 164 and 165 in substations 166 and 167. Substations 166 and 167 together with others are connected by feeder lines 168, 169, 170, 171, 172, 173, 174 and 175 to main station generator line 176 and 177 through main station meters 178, 179, 180 and 181.

Figure 3:
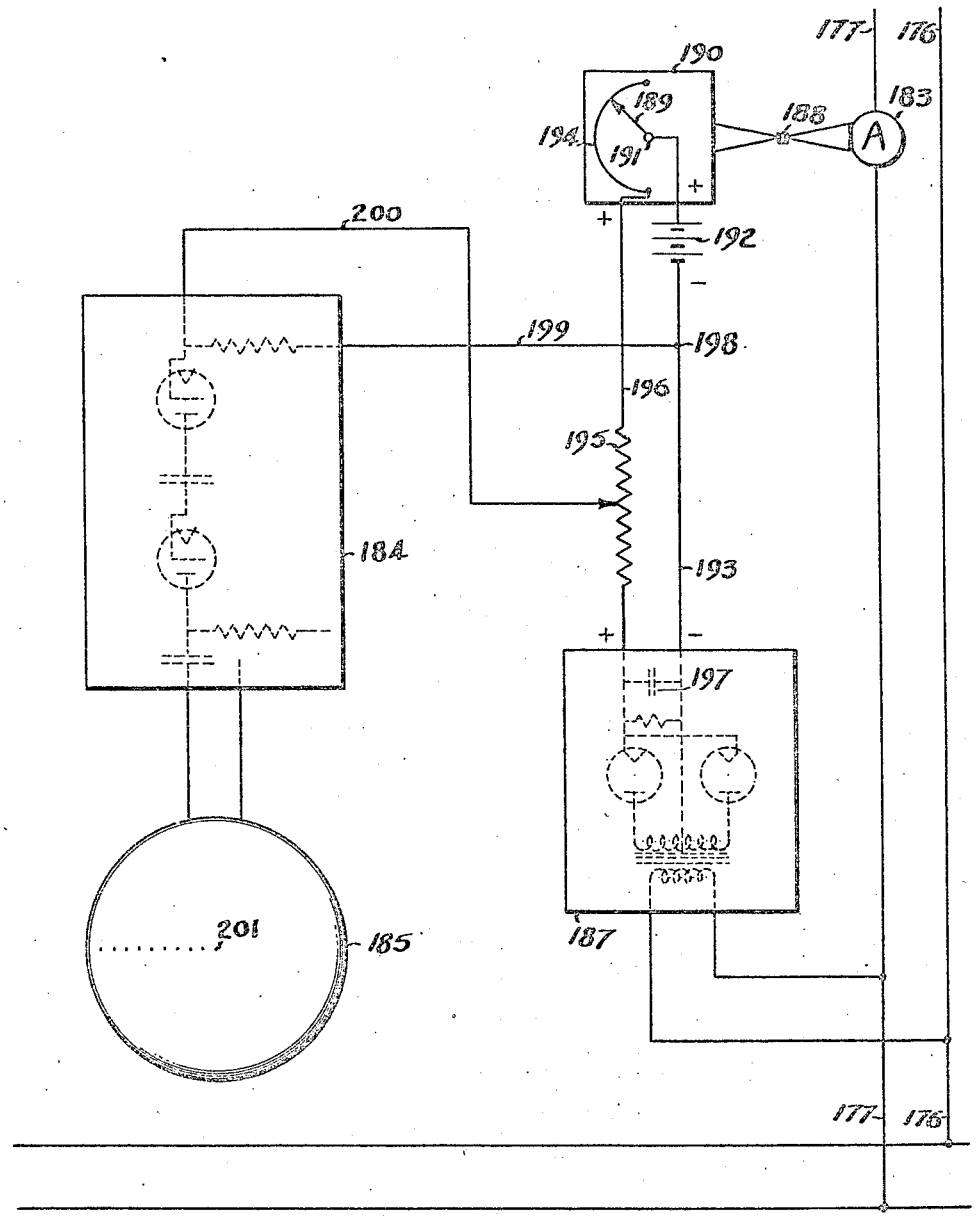
Fig. 3 is a schematic layout of the totalizing center and shows one general method of obtaining the voting differential.

A modulator reading and coding device 182 is connected in the line and contains a line ammeter 183 shown in Fig. 3 has its coil connected in line 177 and may be in series or across a shunt in the normal manner. Modulator 182 is connected to a suitable voltage amplifier 184 which is connected in turn to oscillograph 185 and transmitter 186. Modulator 182 is connected to oscillograph 185 and transmitter 186 by wires diagrammatically suggested in Fig. 1.

Modulator 182 contains a rectifier 187 across main station lines 176 and 177 and an ammeter 183 in series with said line. Ammeter 183 is connected mechanically by selsyn 188 to movable arm 189 of rheostat 190. Selsyn 188 is connected or disconnected under the control of the master modulator key. The pivot 191 of arm 189 is connected to the positive terminal of battery 192. The negative terminal of battery 192 is connected to the negative side of rectifier 187 by wire 193.

The movable end of arm 189 contacts resistance 194 which is connected to the positive side of rectifier 187 through resistance 195 by wire 196. The voltages of battery 192 and rectifier 187 are opposed. Selsyn 188 and condenser 197 add enough mechanical and electrical inertia to the system to smooth out some of the irregularities. Selsyn 188 may be provided with enough drift to continue for a fraction of a second the motion representing a signal trend existing at the instant of disconnection of selsyn 188 and ammeter 183 as determined by the master modulator key device 182 and so slightly project the curve of the value it transfers.

Voltage amplifier 184 has one side connected to junction 198 with wire 193 by wire 199. The input signal to amplifier 184 is obtained by wire 200 which adjustably contacts bridge resistance 195. The output of voltage amplifier 184 is connected to oscillograph 185 and serves to deflect its beam from the central zero position in the manner indicated.

The operation of the system is as follows:

The vibrating reed 143 and its associated equipment are preferably installed at the factory. When receiver 100 is operating the magnetic field of inductance 137 will vary with the amplified voice current in transformer 129 and voice coil 133. The random accelerations experienced by reed 143 cancel out and it does little more than quiver. By random accelerations are meant those signals having a frequency sufficiently close to the natural period of reed 143 to exert a force thereon. The inertia of reed 143 is such that a random pulse normally is not of sufficient duration to cause the reed 143 to move enough to close the circuit at either contact 145 or 146. Should it be found that in a given frequency range such random pulses do close the reed circuit it will be necessary to increase the inertia of reed 143 or change its natural resonant frequency. In the usual case random accelerations accelerate and decelerate the reed 143 as they are in and out of phase with preceding random accelerations and the inertia of reed 143 is so chosen that the time required to attain a sufficient movement to close contacts 145 and 146, while only a small fraction of a second, is long enough to permit both accelerating and decelerating random signals to act on reed 143 and by opposing each other substantially cancel out. An occasional random build up which causes reed 143 to infrequently close the circuits of contacts 145 and 146 may be disregarded as the chances of its occurrence at the instant of registration are small and if so the chance that such random data will not be detected by comparison and check are still smaller. When the central broadcasting station modulation control key is pressed the ten cycle note is radiated from the antenna of transmitter 186 and appears on the magnetic field of inductance 137 as a ten cycle ripple. In about half a second or less the amplitude of vibration of reed 143 builds up and the reed 143 makes contact with one only or both of contacts 145 and 146 in sequence. This action closes the circuit of wires 149 and 156, placing resistance 157 across local lines 101, 102. While this circuit is closed resistance 157 draws one watt of power. Of course any other suitable value may be chosen as desired. Again a suitable capacitance, or inductance or phase shifting circuit may be substituted for resistance 157. This action occurs only in those receivers 100 tuned to the station sending out the ten cycle note on its individual frequency. All the resistors 157 of all such sets draw a watt each. As noted this may be reactive power with the current leading or lagging if desired.

The meters 164, 165, etc., at the various substations show the power drawn by the local lines. Main station meters 178, 179, 180, 181, etc. show the same data. Ammeter 183 fluctuates with the total load of the entire station or that portion over which the desired data is being collected. Selsyn 188 turns arm 189 according to the fluctuations of meter 183 and introduces more or less of resistance 194 into the balanced circuit of rectifier 187 and battery 192 as ammeter 183 falls or rises.

The output of rectifier 187 varies with the load on line 176, 177 and is balanced by the output of battery 192 as controlled by the in-circuit portion of resistance 194. Lead 200 from the input portion of voltage amplifier 184 is positioned at the zero point of bridge resistance 195, so that no signal is carried by wire 200 while the arm 189 fluctuates under the control of ammeter 183. The trace or light point 231 of oscillograph 185 rests at zero position.

When the broadcasting station master modulator control key is pressed the selsyn control 188 is disconnected and the arm 189 drifts very slightly in the direction of the last movement of the selsyn 188, thus projecting the curve of main line current in the direction of its trend at the instant of disconnect, a small amount. Any subsequent increase in the output of rectifier 187 will be unopposed by the momentarily steady output of the circuit of battery 192 and resistance 194 and the difference will be amplified by voltage amplifier 184 and appear on oscillograph as a displacement of trace or light point 201 to the left or upward as the case may be. The amount of displacement will vary directly with the unopposed voltage and may be taken as a measure of the summation of the resistance loads 157 introduced by the properly tuned receivers 100. A reading of twenty k. w. means about twenty thousand receivers are tuned to the signaling station. Much random error may be eliminated by averaging a series of readings. Drastic fluctuations are in a measure smoothed by selsyn 188 and condenser 197.

It may be desirable not to have the oscillograph 185 connected at all times. If so the master modulator key should be connected to perform the following functions:
1. Disconnect selsyn control 188.
2. Connect rectifier 187 to bridge circuit.
3. Connect D. C. battery to bridge circuit.
4. Connect voltage amplifier 184 to the bridge circuit at point of balance in resistor 195.

This device offers wide application and various embodiments of the invention may be made without departing from the spirit thereof.

The device functions by measuring increments of load at a chosen instant. This increment may be resistance or reactance. Random error caused by other loads being placed upon or removed from the line is caused to cancel itself as outlined above. Any error may be reduced by a series of readings closely related in time.

I claim:
1. In a telemetering system, transmitting means propagating radiant energy at a fixed carrier frequency, means coupled to said transmitting means for modulating said fixed carrier frequency with a predetermined signal frequency, a plurality of receiving means adjustably tunable to said carrier frequency, an electrical network, each of said plurality of receiving means including an impedance and switching means coupled to said impedance and to said electrical network, said switching means including means responsive to said signal frequency and coupling said impedance to said network when said carrier frequency is modulated by said signal frequency, indicating means coupled to said electrical network, said indicating means having a datum indication, variable bucking load means coupled to said indicating means and to said electrical network, said bucking load means opposing electrical variations in said electrical network to maintain said indicating means at its datum indication when said carrier frequency is not modulated by said signal frequency, said bucking means including means disconnecting said bucking means from said electrical network when said carrier frequency is modulated by said signal frequency.

2. A system as claimed in claim 1 wherein each of said receiving means includes means for demodulating said carrier frequency to reproduce said signal frequency.

3. A system as claimed in claim 1 wherein said transmitting means includes means selectively modulating said carrier frequency with a variable intelligence frequency and with said signal frequency.

4. A system as claimed in claim 1 wherein said switching means includes means mechanically resonant at said signal frequency.

5. A system as claimed in claim 1 wherein said switching means comprised a relay having at least two contacts and a movable reed suspended between said contacts, said reed being mechanically resonant at said signal frequency and having such inertia that several cycles of oscillations at said signal frequency are required to cause the amplitude of mechanical oscillation of said reed to become sufficient for the reed to touch said contacts.

6. A system as claimed in claim 1 in which said indicating means includes oscilloscope means.

7. A system as claimed in claim 1 wherein said bucking load means is so constructed as to have sufficient inertia to continue to affect the datum indication of said indicating means after said bucking load is disconnected from said network in the same manner it was affecting said indication immediately before said bucking load was disconnected.

8. A system as claimed in claim 1 wherein said bucking load comprises metering means, a variable resistance, and a selsyn coupled to said metering means and to said variable resistance.

HERBERT S. POLIN.

REFERENCES CITED

The following references are of record in the file of this patent:

UNITED STATES PATENTS

| Number | Name | Date |
|---|---|---|
| 1,944,315 | Clapp | Jan. 23, 1934 |
| 1,990,489 | Hopkins | Feb. 12, 1935 |
| 2,063,610 | Linsell | Dec. 8, 1936 |
| 2,092,119 | Hopkins | Sept. 7, 1937 |
| 2,092,120 | Hopkins | Sept. 7, 1937 |
| 2,096,109 | Hopkins | Oct. 11, 1937 |
| 2,140,016 | Kautter | Dec. 13, 1938 |
| 2,188,165 | Thomas | Jan. 23, 1940 |
| 2,206,702 | La Pierre | July 2, 1940 |
| 2,213,886 | Potter | Sept. 3, 1940 |
| 2,397,562 | Potter | Apr. 2, 1946 |
| 2,513,360 | Rahmel | July 4, 1950 |